US010452337B1

(12) United States Patent
Clements et al.

(10) Patent No.: US 10,452,337 B1
(45) Date of Patent: Oct. 22, 2019

(54) CONTROLLED-ENVIRONMENT FACILITY DIGITAL BULLETIN BOARD

(71) Applicant: Securus Technologies, Inc., Dallas, TX (US)

(72) Inventors: Alice J. Clements, Coppell, TX (US); Joseph Higgs, Fort Worth, TX (US); Matthew Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/364,090

(22) Filed: Nov. 29, 2016

Related U.S. Application Data

(60) Provisional application No. 62/261,298, filed on Nov. 30, 2015.

(51) Int. Cl.
G06F 3/14 (2006.01)
H04N 7/14 (2006.01)
G06F 3/0483 (2013.01)

(52) U.S. Cl.
CPC .......... *G06F 3/1454* (2013.01); *H04N 7/147* (2013.01); *G06F 3/0483* (2013.01)

(58) Field of Classification Search
CPC ...... G06F 3/1454; G06F 3/0483; H04N 7/147
See application file for complete search history.

(56) References Cited

U.S. PATENT DOCUMENTS

| 5,892,769 | A  | * | 4/1999  | Lee ...................... H04L 12/413 370/447 |
| 6,021,262 | A  | * | 2/2000  | Cote ................... G06F 11/0781 709/223 |
| 6,202,058 | B1 | * | 3/2001  | Rose ................. G06F 17/30699 706/45 |
| 9,936,161 | B1 | * | 4/2018  | Noland ................... H04N 7/147 |
| 2001/0003189 | A1 | * | 6/2001  | Miyazawa .......... G06F 3/04817 709/206 |
| 2001/0005843 | A1 | * | 6/2001  | Tokashiki ............ G11B 27/002 |
| 2001/0047291 | A1 | * | 11/2001 | Garahi ................. G06Q 10/063 705/7.11 |
| 2002/0019755 | A1 | * | 2/2002  | Kagami ................. G06Q 10/02 705/5 |
| 2002/0138582 | A1 | * | 9/2002  | Chandra ................ G06Q 10/10 709/206 |

(Continued)

*Primary Examiner* — Sejoon Ahn
(74) *Attorney, Agent, or Firm* — Fogarty LLP

(57) ABSTRACT

A controlled-environment facility and/or communications management system interface accepts definition of a digital bulletin board message directed to at least one controlled-environment facility resident, accepts assignment of a priority for displaying the digital bulletin board message on the digital bulletin board and a schedule for display of the digital bulletin board message and accepts assignment of the digital bulletin board message to controlled-environment resident communication and/or media device(s) disposed in the controlled-environment facility. The digital bulletin board message(s) are received by the controlled-environment resident communication and/or media device(s) to which the digital bulletin board message is assigned, and are displayed by the controlled-environment resident communication and/or media device(s) to which the digital bulletin board message(s) are assigned, in accordance with the assigned priority and the schedule for display of the digital bulletin board message(s).

21 Claims, 5 Drawing Sheets

(56) References Cited

U.S. PATENT DOCUMENTS

| | | | | |
|---|---|---|---|---|
| 2003/0055908 A1* | 3/2003 | Brown | .................... | H04L 29/06 709/207 |
| 2004/0049538 A1* | 3/2004 | Akamatsu | .............. | G06Q 30/02 709/203 |
| 2004/0181444 A1* | 9/2004 | Sandrew | ................ | G06Q 10/10 717/154 |
| 2004/0267871 A1* | 12/2004 | Pratley | .................. | G06Q 10/10 709/200 |
| 2006/0190966 A1* | 8/2006 | McKissick | ............ | G06Q 30/02 725/61 |
| 2006/0277467 A1* | 12/2006 | Reponen | ................ | G06F 3/011 715/708 |
| 2006/0293572 A1* | 12/2006 | Bulat | ................... | A61B 5/0002 600/300 |
| 2007/0115108 A1* | 5/2007 | Martin | ................... | G08B 25/14 340/506 |
| 2008/0000966 A1* | 1/2008 | Keiser | ................... | G06Q 10/10 235/382 |
| 2008/0045195 A1* | 2/2008 | Cortegiano | ......... | H04M 3/4878 455/414.3 |
| 2008/0065418 A1* | 3/2008 | Byrom | .................. | G06F 19/363 705/3 |
| 2008/0068447 A1* | 3/2008 | Mattila | .................. | H04N 7/147 348/14.08 |
| 2008/0177760 A1* | 7/2008 | Fein | ..................... | G06F 19/3418 |
| 2011/0191688 A1* | 8/2011 | Hasegawa | ............... | G06F 15/00 715/738 |
| 2012/0324511 A1* | 12/2012 | Koh | ....................... | H04H 60/06 725/53 |
| 2013/0067375 A1* | 3/2013 | Kim | ....................... | F25D 29/00 715/769 |
| 2013/0083906 A1* | 4/2013 | Roberts | .................. | H04N 7/147 379/88.13 |
| 2013/0194377 A1* | 8/2013 | Humphries | .............. | H04N 7/15 348/14.08 |
| 2014/0022328 A1* | 1/2014 | Gechter | ................. | G06Q 30/06 348/14.02 |
| 2015/0033144 A1* | 1/2015 | Kim | ....................... | H04L 67/36 715/752 |

* cited by examiner

Interface

| HOME | SYSTEM | MONITOR | TOOLS | ADMIN | FACILITY PORTAL |

MANAGEMENT LEVEL

Facility: Facility #1  >>  Site: All Sites

DBB Message  Saved Searches
☐ FILL IN SEARCH CRITERIA (Use * for wild card/partial searches)

| Message Id#: | | Status: -None Selected- ▼ | Work Queue: -None Selected- ▼ | Escalation Priority: |
|---|---|---|---|---|
| Inmate Information | | | | |
| First Name: | | Last Name: | Account: | PIN#: |
| Submission Date | | | | |
| Start: 08/27/2014 00:00:00 (MM/DD/YYYY hh:mm:ss) | | End: 10/27/2016 23:59:59 (MM/DD/YYYY hh:mm:ss) | Schedule: | To Day#: |

[Search] [Save Criteria] [EXCEL] [PDF] [CSV] [EMAIL] [Reset]

Digital Bulletin Board

15 RESULTS    PAGE 1 OF 1    Age Summary  EXCEL  PDF  CSV

| Message | DATE SUBMITTED (CENTRAL TIME) ▼ | RESIDENT NAME | ACCOUNT # | PIN# | Message Txex | Schedule | Priority | SITE | TERMINAL |
|---|---|---|---|---|---|---|---|---|---|
| 64 | 10/15/2016 09:17:54 | N/A | N/A | N/A | POD CLEANING DAY TOMORROW | C | Level 0 | Facility #1 | Pod A-6 |
| 65 | 10/16/2016 11:00:00 | John Doe | 123456 | 987 | REPORT TO INFIRMARY | A | Level 1 | Facility #1 | |

FIG. 2

CONTROLLED-ENVIRONMENT FACILITY DIGITAL BULLETIN BOARD

CROSS-REFERENCE TO RELATED APPLICATION

This application claims the benefit of U.S. Provisional Patent Application Ser. No. 62/261,298, entitled Digital Bulletin Board, filed Nov. 30, 2015, which is incorporated herein by reference.

TECHNICAL FIELD

The present disclosure relates generally to controlled-environment facilities, more particularly to communication with residents of controlled-environment facilities, and specifically to communication from facility administrators with residents, via digital bulletin boards, or the like.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated.

Additionally, over the past several years, the above-mentioned sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel.

In a controlled-environment facility, such as a jail or prison, information must occasionally be provided to all or many residents or inmates. Facilities typically suffer from not being able to easily communicate to residents. As a result, there are complexities and challenges related to "getting the word out" about various topics, which in correctional facility environments, for example, may range from pod cleaning-day reminders, to changes in the lunch menu, to security status indications.

Typically, controlled-environment facility management communicates to supervisors, such as correctional staff, who then verbally communicate the message to all residents. Alternatively, a paper message may be drafted and copies passed out to the residents or posted in resident living spaces. A video communication may be played for residents on televisions or audio messages played over a loud speaker to communicate the message. Other more intrusive methods, such as injecting messages or prompts into the automated telephone operator, may be used to communicate with residents when they place calls.

Limited access to residents causes confusion when there are changes to facility communication features and results in delayed resident acceptance of new and beneficial communication abilities. Additionally, residents are not able to forewarn or notify their friends and family outside the facility of the changes.

SUMMARY

The present invention is directed to systems and methods which provide a resident-facing digital bulletin board in a controlled-environment facility. The controlled-environment facility may be a correctional facility, or the like, and the controlled-environment facility resident may correspondingly be an inmate, or the like.

Regardless, a controlled-environment facility and/or communications management system interface accepts definition of a digital bulletin board message directed to at least one controlled-environment facility resident. The definition of the digital bulletin board message may include text and optional graphics for inmate communications.

The controlled-environment facility and/or communications management system interface also accepts assignment of a priority for displaying the digital bulletin board message on the digital bulletin board and a schedule for display of the digital bulletin board message and assignment of the digital bulletin board message to at least one controlled-environment resident communication and/or media device disposed in the controlled-environment facility. The controlled-environment resident communication and/or media device(s) may be at least one personal computer wireless device adapted and/or approved for use in controlled-environment facility and/or at least one video phone particularly adapted for use in a controlled-environment facility.

The digital bulletin board message may be sent to the controlled-environment resident communication and/or media device(s) by the controlled-environment facility communications management system, such as, sent as an update of existing digital bulletin board messages assigned to the controlled-environment resident communication and/or media device(s). The controlled-environment resident communication and/or media device(s) to which the digital bulletin board message is assigned receives the digital bulletin board message, and may be received by the controlled-environment resident communication and/or media device(s), as an update of existing digital bulletin board messages assigned to the controlled-environment resident communication and/or media device(s).

The digital bulletin board message is displayed by the controlled-environment resident communication and/or media device(s) to which the digital bulletin board message is assigned, in accordance with the assigned priority and the schedule. Display of the digital bulletin board message may include a controlled-environment resident communication and/or media device that is displaying the digital bulletin board message receiving interaction by a resident with the displayed digital bulletin board message. Whereupon, display of other digital bulletin board messages on the controlled-environment resident communication and/or media device may be paused, Thereafter, display of digital bulletin board messages assigned to the controlled-environment resident communication and/or media device may be resumed, in accordance with the assigned priority and schedule for display of the digital bulletin board messages assigned to the controlled-environment resident communication and/or media device after a predetermined time.

Definition of an application program relevant to at least a portion of the digital bulletin board message may be accepted as such an interaction mechanism. In which case, display of the digital bulletin board message may include the controlled-environment resident communication and/or media device accepting interaction by a resident with at least the portion of the displayed digital bulletin board message to open the application program relevant to the digital bulletin board message for interaction with the resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
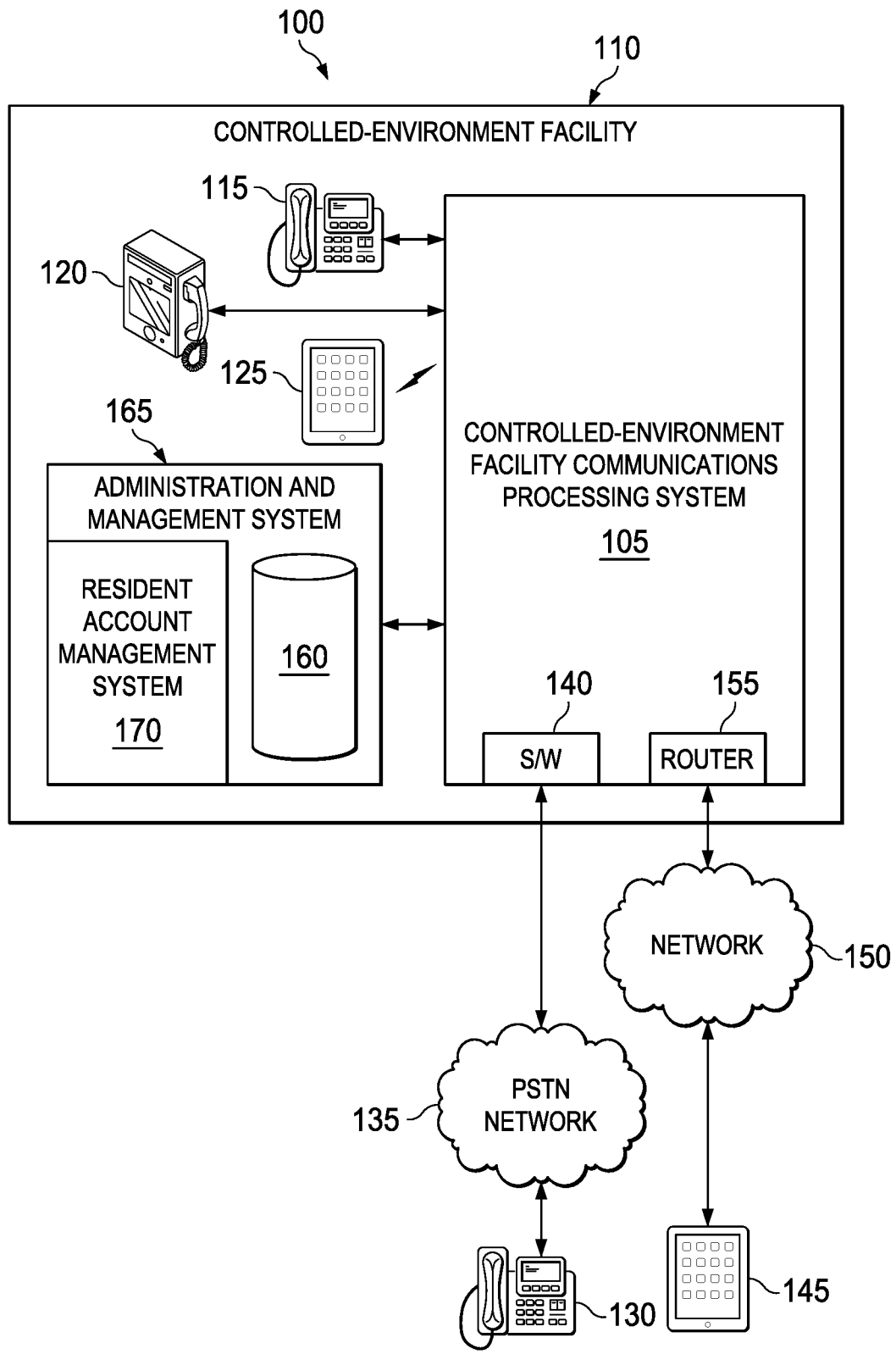
Figure 3:
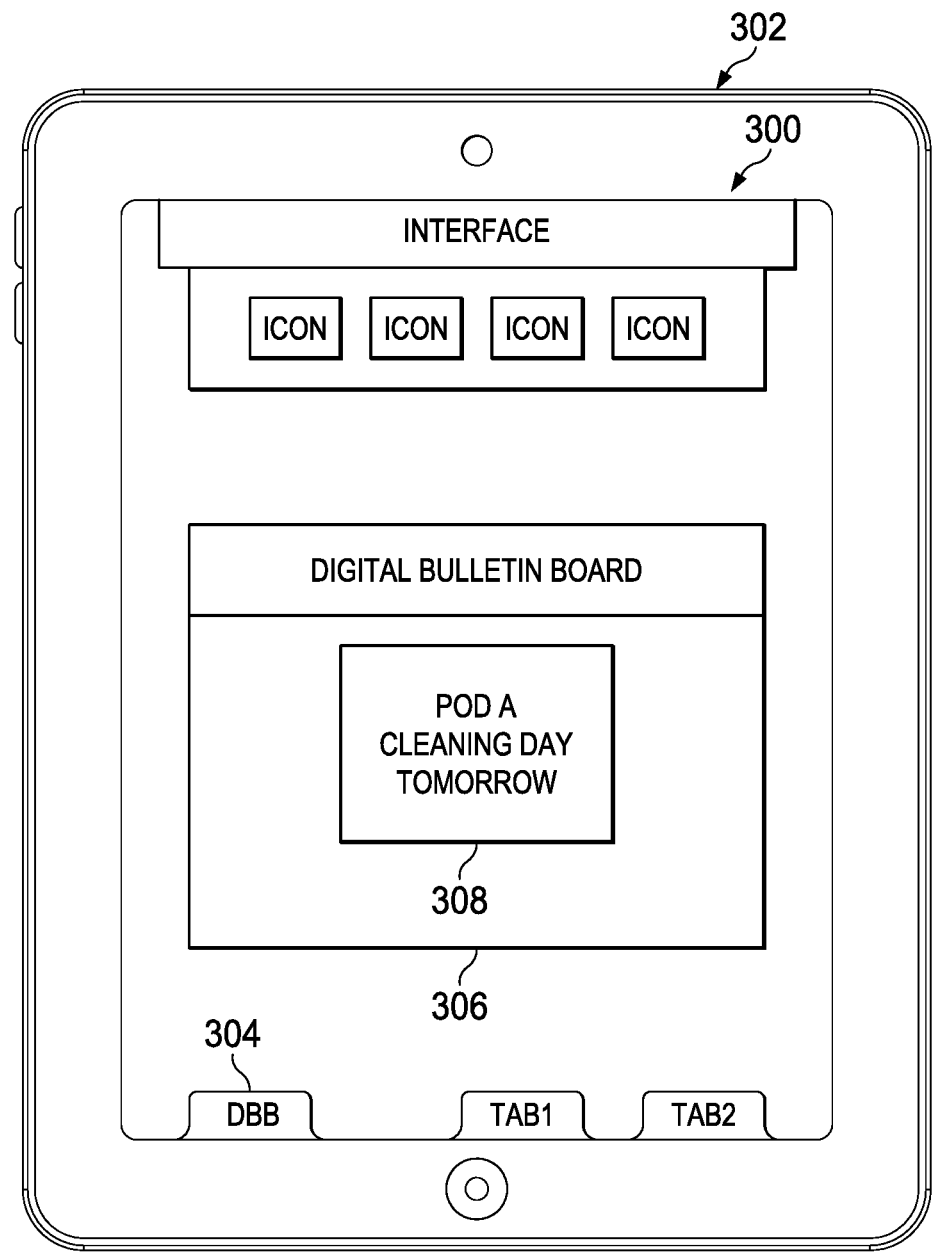
Figure 4:
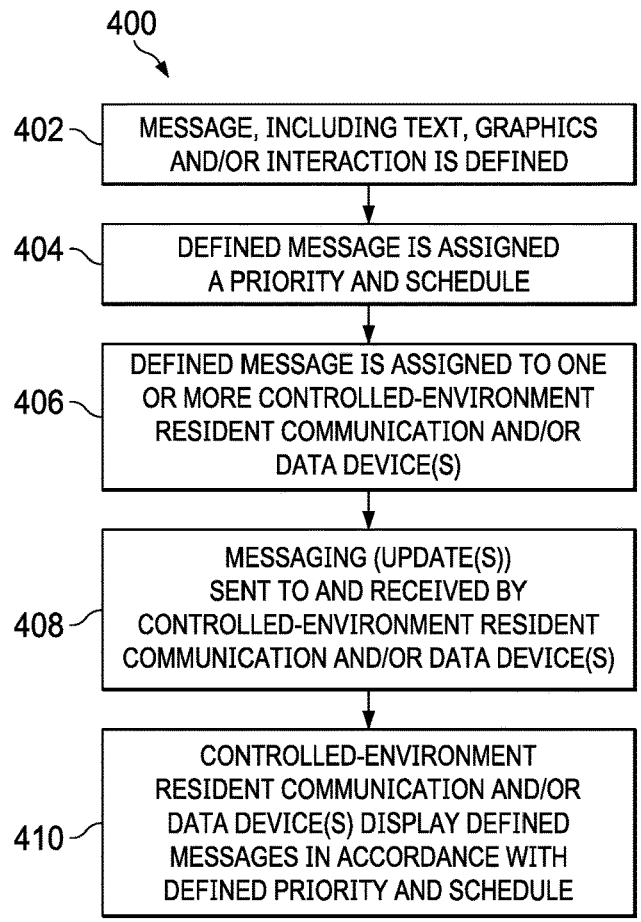
Figure 5:
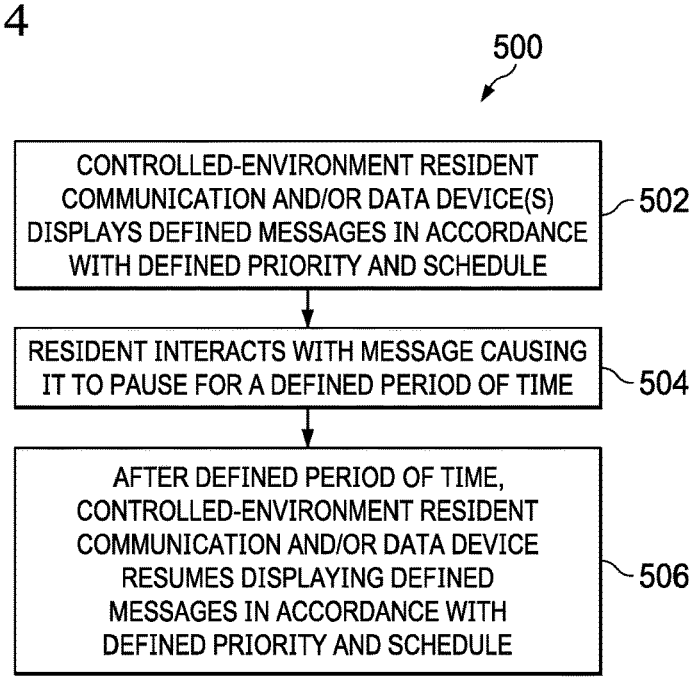
Figure 6:
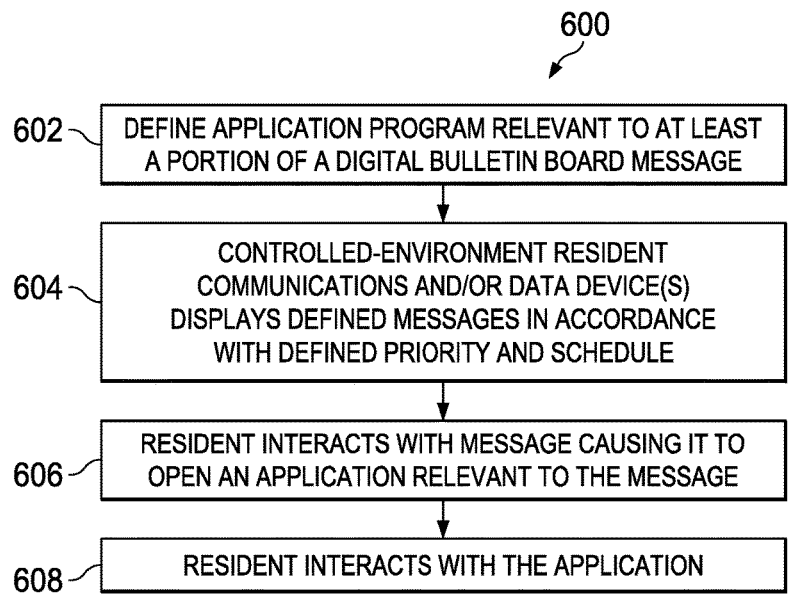
Figure 7:
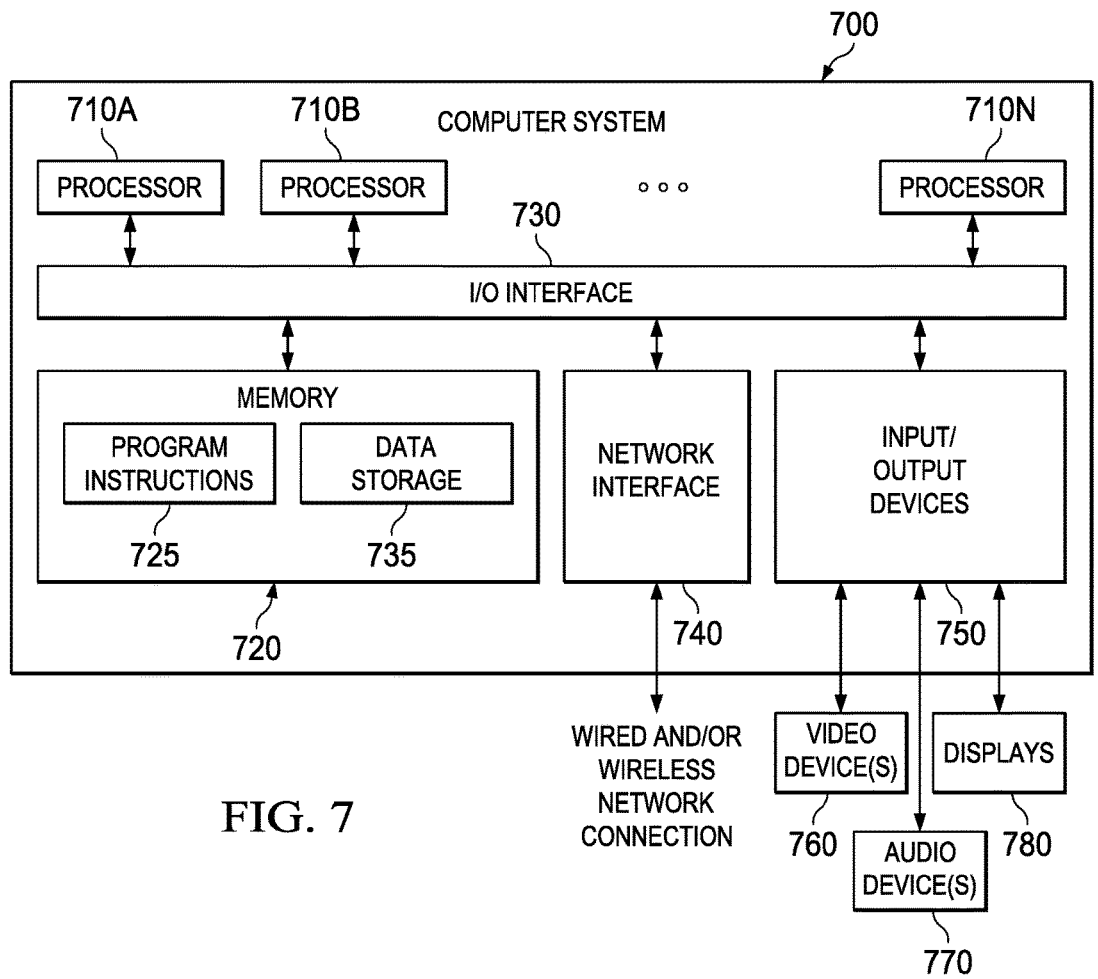

Having thus described the invention in general terms, reference will now be made to the accompanying drawings, which are not necessarily drawn to scale, and wherein:

FIG. 1 is a diagrammatic illustration of an example controlled-environment facility environment, wherein embodiments of the present controlled-environment facility digital bulletin board systems and methods may be employed, according to some embodiments of the present systems and methods;

FIG. 2 is a diagrammatic illustration of a controlled-environment facility administration and management system interface providing a digital bulletin board dashboard for creation and management of digital bulletin board messages, in accordance with some embodiments of the present systems and methods;

FIG. 3 is a diagrammatic illustration of an example intelligent controlled-environment facility resident communication and/or media device, showing an example intelligent controlled-environment facility resident communication and/or media device interface displaying a digital bulletin board (and message) according to some embodiments of the present systems and methods;

FIG. 4 is a flowchart for presenting controlled-environment facility digital bulletin board messages according to at least one example implementation of the present controlled-environment facility digital bulletin board systems and methods, under some embodiments;

FIG. 5 is a flowchart for pausing presentation of controlled-environment facility digital bulletin board messages according to at least one example implementation of the present controlled-environment facility digital bulletin board systems and methods, under some embodiments;

FIG. 6 is a flowchart for interacting with controlled-environment facility digital bulletin board messages according to at least one example implementation of the present controlled-environment facility digital bulletin board systems and methods, under some embodiments; and FIG. 7 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

The present systems and methods relate generally to controlled-environment facilities, more particularly to communication with residents of controlled-environment facilities, and specifically to communication from facility administrators with residents, via digital bulletin boards, or the like. In accordance with embodiments of the present systems and methods, a controlled-environment facility and/or communications management system interface accepts definition of a digital bulletin board message directed to at least one controlled-environment facility resident, accepts assignment of a priority for displaying the digital bulletin board message on the digital bulletin board and a schedule for display of the digital bulletin board message and accepts assignment of the digital bulletin board message to controlled-environment resident communication and/or media device(s) disposed in the controlled-environment facility. The digital bulletin board message(s) are received by the controlled-environment resident communication and/or media device(s) to which the digital bulletin board message is assigned, and are displayed by the controlled-environment resident communication and/or media device(s) to which the digital bulletin board message(s) are assigned, in accordance with the assigned priority and the schedule for display of the digital bulletin board message(s).

Embodiments of the present systems and methods provide communication with controlled-environment facility residents, such as correctional facility inmates. Correctional personnel, or other controlled-environment facility staff, can easily communicate with inmates or other controlled-environment facility residents to provide clear and consistent messages under embodiments of the present systems and methods, without the need for paper or face to face communication. Embodiments of the present systems and methods provide such controlled-environment facility controlled-environment facility digital bulletin boards using intelligent controlled-environment facility resident communication and/or media device and controlled-environment facility administration and management system interfaces. That is, in some correctional facilities (some) inmates have the privilege of use of a resident media device such as a tablet computing device, media players, kiosks, telephone video devices, or the like, which may be specially adapted for use in the/a correctional facility, and/or may otherwise be approved for use in the correctional facility. Hence, a controlled-environment facility administration and management system, or the like, may have more control over the resident media device than is typical for outside tablet computing device, media players, telephones, video devices, or the like.

Such an intelligent controlled-environment facility resident communication and/or media device may be an Intelligent Facility Device (IFD) (e.g. a video phone particularly adapted for use in a controlled-environment facility) or an Intelligent Resident Device (IRD) (e.g. a personal wireless device, such as a tablet computing device or smartphone, which may be adapted and/or approved for use in controlled-environment facility), described in greater detail below. In accordance with embodiments of the present systems and methods, a controlled-environment facility resident interface runs on top of, or as part of, an operating system of a controlled-environment facility resident communication and/or media device. The interface may request, accept and verify identification information from a resident of the controlled-environment facility operating the device. The interface presents application programs (apps) available for use by the resident on the device, via the interface. A selected app, such as may be executed in accordance with embodiments of the present systems and methods, may provide the present controlled-environment facility digital bulletin board on the resident's side, while a controlled-environment facility administration and management system interface may provide a controlled-environment facility digital bulletin board processing dashboard on the facility's side.

FIG. 1 is a diagrammatic illustration of controlled-environment facility environment 100, wherein example embodiments of the present controlled-environment facility digital bulletin board systems and methods may be employed, according to some embodiments of the present systems and methods. Controlled-environment facility communications processing system 105 may provide telephone services, videoconferencing, online chat, and other communication services to residents of controlled-environment facility 110. In some cases, such as illustrated, communications processing system 105 may be co-located with controlled-environment facility 110. Alternatively, communications processing system 105 may be centrally and/or remotely located with respect to one or more controlled-environment facilities and/or may provide communication services to multiple controlled-environment facilities. More generally, however, it should be noted that communications processing system 105 may assume a variety of forms, and may be configured to serve a variety of facilities and/or users, whether within or outside of a controlled-environment facility.

Residents may use more-or-less conventional telephones 115 to access certain communication services. However, in accordance with embodiments of the present systems and methods, residents may also use a controlled-environment communication and/or media device or the like. For example, a resident may use a video communication device 120, or the like, to place voice calls, as well as for video communication. Such a video communication device may be referred to as an Intelligent Facility Device (IFD), which may be a video phone particularly adapted for use in a controlled-environment facility. Generally speaking, multiple video communication devices/IFDs 120 are disposed in controlled-environment facility, and may be disposed in a visitation room, in a pod, as part of a kiosk, etc. Additionally or alternatively, in accordance with embodiments of the present systems and methods, personal computer wireless devices, such as a tablet computing device or smartphone (125), which may have been adapted and/or approved for use in controlled-environment facility, may be used by controlled-environment facility residents for communication. Such a personal resident device may be referred to as an Intelligent Resident Device (IRD), or the like, in controlled-environment facilities, in general and/or referred to as an Intelligent Inmate Device (IID) in a correctional institution environment. As will be appreciated, IFD 120, IRD 125, or other similar devices have video conferencing capabilities, or the like, to enable a party to participate in video communication sessions with other call parties, such as non-residents of the controlled-environment facility, via video communication, secure online chat, etc. Regardless, IFDs, IIDs, IRDs, etc. may be generally referred to herein as "controlled-environment resident communication and/or media devices," or the like.

In various embodiments, video communication devices, such as IFDs 120, may be implemented as a computer-based system. For example, each of IFD 120 may include a display, camera, and handset. The display may be any suitable electronic display such as, for example, a Liquid Crystal Display (LCD), a touchscreen display (e.g., resistive, capacitive, etc.), or the like, whereas the camera may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone). During a video communication session, IFD 120 may be configured to capture a video image of a resident to be transmitted to a non-resident using the camera, and to display a video image of the non-resident to the resident using the display. IFD 120 may also be configured to capture an audio signal from the resident to be transmitted to a non-resident using the mouthpiece portion of the handset, and to provide an audio signal from the non-resident to the resident using the earpiece portion of the handset. Additionally or alternatively, audio received from the non-resident may be reproduced via a loudspeaker, and audio provided by the resident may be captured via a microphone. In some cases, IFD 120 may assume the form of any computer, tablet computer, smart phone, etc., or any other consumer device or appliance with videoconferencing capabilities. For example, in a correctional facility environment a tablet computing device, similar to an IRD discussed below, may be mounted on a wall, in a hardened case, as a video communication device or IFD.

IRDs 125 may be tablet computing devices, smartphones, media players, or the like adapted and/or approved for use by residents of the controlled-environment facility (within the controlled-environment facility). Each IRD 125 may be particularly adapted for use in a controlled-environment. For example, in a correctional institution, jail, or the like, such an IRD, or IID, may have a specially adapted operating system and/or may be "stripped-down," particularly from the standpoint of what apps and/or hardware are provided or allowed on IRD 125, and/or connectivity afforded such a IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

In accordance with embodiments of the present systems and methods, controlled-environment facility resident communication and/or media device, IFD 120, IRD 125, or the like, may present via a resident interface, apps such as: a controlled-environment facility resident calling application, a video visitation application, a controlled-environment facility resident's manual, a controlled-environment facility resident commissary ordering application, a music player, a video player, a web browser (which may be limited to only accessing secure websites and/or third party websites of approved vendors), a document reading program, an email application, a Prison Rape Elimination Act (PREA) information document, a PREA hotline, a legal research application, a job search application, a controlled-environment facility resident grievance submittal application, sick call app, education app, weather app, video mail, resident information app, games, a forms completion and submission functionality, a controlled-environment facility digital bulletin board in accordance with embodiments of the present systems and methods, and/or the like.

In various embodiments, to access communication services, a resident may initiate telephone services by lifting the receiver on telephone 115 or IFD 120, and/or otherwise initiating a call, such as by launching a communications application program (app) on IRD 125. At which time, the resident may be prompted to provide a personal identification number (PIN), other identifying information or biometrics. An Interactive Voice Response (IVR) unit (not shown, but which may be integrated into communication processing system 105) may generate and play a prompt, or other messages, to the resident on device 115, 120 or 125. Under the control of communication processing system 105, devices 115, 120 and 125 may be capable of connecting to a non-resident's (i.e., a person not incarcerated or otherwise committed to a controlled-environment facility) telephone 130 across a Publicly Switched Telephone Network (PSTN) 135. For example, telephone 130 may be located at a non-resident's home or office, at a resident visitation center, etc. Switch 140, in communication processing system 105, may be used to connect calls across PSTN 135. Additionally or alternatively, the non-resident may communicate using device 145, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 150. Router 155 of communication processing system 105 is used to route data packets associated with a call connection to device 145. For example, a non-resident party may have a device 145 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as $^{SKYPE}$®. Additionally or alternatively, the correctional facility and/or the destination may use videoconferencing equipment compatible with ITU H.323, H.320, H.264, and/or V.80, or other suitable standards.

In addition to providing certain visitation and communication operations, communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) and/or Personal Allowed Number (PAN) list. Each resident's PAC and/or PAN list(s) may be stored, for example, in database 160 maintained by controlled-environment Administration and Management System (AMS) 165. In addition to PAC and/or PAN list(s), AMS 165 may also store Resident Profile Data (RPD), as well as communication and/or visitation rules applicable to each resident. As an example, in the context of a correctional facility, AMS 165 may be referred to as a Jail Management System (JMS). Within the AMS or JMS 165, database 160 may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility resident account management system 170, which may be a separate system, or which may be a part or function of AMS 165, as illustrated, may maintain resident accounts to the benefit of the respective resident, such as resident commissary accounts, resident communications accounts, which may be used to pay for communications, such as phone calls, video visitation, internet chats, emails, text messages, or the like, etc.

In some implementations, communication processing system 105 may be configured to perform communication monitoring operations, such being configured to monitor and or record communication sessions (e.g., as electronic video files). In scenarios where communication processing system 105 is located within the controlled-environment facility, it may have direct access to AMS or JMS 165. In other embodiments, however, communication processing system 105 may be located remotely with respect to the controlled-environment facility, and access to AMS or JMS 165 may be obtained via a computer network such as, for example, network 150.

Thus, in accordance with embodiments of the present systems and methods, a controlled-environment facility resident communication and/or media device, IFD 120, IRD 125, or the like, may include at least one processor and a memory coupled to the at least one processor, such as discussed in greater detail below, with reference to FIG. 5. This memory may be configured to store program instructions executable by the at least one processor. Such program instructions may include a controlled-environment facility resident communication and/or media device operating system and a controlled-environment facility resident interface program. This interface program may include program instructions executable by the at least one processors to cause controlled-environment facility resident communication and/or media device 120 or 125 to run the controlled-environment facility resident interface on top of, or as part of, the operating system and present apps available for use by a controlled-environment facility resident on the controlled-environment facility resident communication and/or media device. This interface may act as a resident communications platform, and also or alternatively, provide automated login for interface applications. The interface may request and accept identification information from the resident, such as information that may confirm the identity of the resident. This identification may be verified, such as through the interface, by controlled-environment facility communications processing system 105, AMS 165, and/or the like, to complete such a login. In accordance with embodiments of the present systems and methods, the interface program instructions may also permit and/or facilitate execution of the apps, such as when one of these apps is selected by the resident, via the interface. For example, the interface may present the controlled-environment facility digital bulletin board, as an application, or persistent tab, under, or as part of, the intelligent controlled-environment facility resident communication and/or media device interface. The interface may also countdown a predetermined amount of time the selected app remains active, a predetermined number of times that an app can be opened, a predetermined number of times that a form can be submitted, a predetermined time an app remains open and/or is executed, multitasking functionality between open apps, etc.

Thus, in accordance with embodiments of the present systems and methods a controlled-environment facility communications system may include, for example controlled-environment facility communications processing system 105 and controlled-environment facility administration and management system 165. Therein, controlled-environment facility resident communication and/or media device(s) (120, 125), may employ an operating system and a controlled-environment facility resident interface running on top of, or as part of, the operating system. Embodiments provide a digital bulletin board that allows users to dynamically change and communicate messages directly to controlled-environment facility residents electronically on controlled-environment facility resident-facing hardware. This negates the need for paper communications, video communications, loud speaker communications, or verbal communication that is passed through several people.

Embodiments of the present systems and methods offer service providers and authorized facility staff the ability to present messages to residents in a number of contexts, such as: to all residents at all jail/prison locations; to all residents within a specific jail/prison; to all residents within a particular housing unit; and to all residents viewing a specific terminal.

An ability to display multiple messages may be accommodated in accordance with embodiments of the present systems and methods in a number of ways. For example, by configuring how long to display each specific message so that multiple messages can be displayed in rotation, by allowing the digital bulletin board area to be split into multiple areas so that multiple, rotating messages can be displayed at a time, etc.

Scheduling and prioritization of messages is provided in accordance with embodiments of the present systems and methods to allow messages to be configured in advance and displayed when desired and with the ability to "take over" the digital bulletin board so as to present a high priority message and then automatically resume the normal rotation when the priority message is no longer scheduled to be displayed.

Turn for the time being to FIG. 2, a diagrammatic illustration of controlled-environment facility administration and management system interface 200 providing controlled-environment facility digital bulletin board processing dashboard 202 for creation (i.e. defining) and management of digital bulletin board messages, in accordance with some embodiments of the present systems and methods. In accordance with such embodiments of the present systems and methods the controlled-environment facility administration and management system (e.g. AMS 165) or another system, such as communications processing system 105, which as noted may be co-located with controlled-environment facility 110, centrally and/or remotely located with respect to one or more controlled-environment facilities, may maintain the controlled-environment facility digital bulletin board. For example, illustrated AMS 165 and/or communications processing system 105 specific to controlled-environment facility 110 may maintain a digital bulletin board for that facility, in accordance with embodiments of the present systems and methods. Alternatively, or additionally, an interface such as interface 200 may be employed by a controlled-environment facility service provider, such as a communications service provider, or the like to create messages, which may include advertising, for dissemination to controlled-environment facility residents, in accordance the present digital bulletin board systems and methods. For example, a centralized external controlled-environment facility communications management system may be used to create (i.e. define) and manage digital bulletin board messages, in accordance with some embodiments of the present systems and methods.

In accordance with embodiments of the present systems and methods a controlled-environment facility digital bulletin board message system may include a controlled-environment facility management system and/or communications management system configured to run controlled-environment facility management interface 200 on top of, or as part of, the controlled-environment facility management system and/or communications management system operating system. This system may accept, via controlled-environment facility and/or communications management interface 200, definition of a digital bulletin board message 204 directed to at least one controlled-environment facility resident 206. This definition of the digital bulletin board message may include text, a graphic, and/or links to be included in the digital bulletin board message, an interaction mechanism, or the like to be included in the digital bulletin board message.

Assignment of priority 208 for displaying the digital bulletin board message on the digital bulletin board may also be accepted via interface 200 and dashboard 202. Further, schedule 210 for display of the digital bulletin board message may be accepted, as well as assignment 212 of the digital bulletin board message to at least one intelligent controlled-environment facility resident communication and/or media device disposed in the controlled-environment facility.

Controlled-environment facility management system 165 and/or communications management system 105 may also be configured, in accordance with embodiments of the present systems and methods to send the digital bulletin board message to the assigned intelligent controlled-environment facility resident communication and/or media device for display on the digital bulletin board, in accordance with the assigned priority and schedule. In accordance with embodiments of the present systems and methods the digital bulletin board message may be sent to the intelligent controlled-environment facility resident communication and/or media device(s) by the controlled-environment facility and/or communications management system and may be received by the device(s) as an update of existing digital bulletin board messages assigned to the device(s).

The controlled-environment facility and/or communications management system may also time and date stamp submitted digital bulletin board messages for management by controlled-environment facility staff via controlled-environment facility management interface dashboard 202. For example, an aging summary, or the like for digital bulletin board messages, or the like, may be provided to show the age of posted messages, and/or the like.

Further, as noted routing of digital bulletin board messages may be selectively defined via dashboard 202. Also, in accordance with various embodiments of the present systems and methods the routing processes may be selectively defined based on one or more particular residents, or a class of residents, a message is directed to. For example, in a correctional facility environment, digital bulletin board message, such as the pod cleaning day message depicted in FIG. 3, discussed below may be directed to residents in a particular location. To wit, messages may be directed to devices disposed in that particular location.

Interface 200 and/or dashboard 202 may provide other functionality, such as search window 214, which may provide for output of search reports in various formats (216), or the like. Other such functionality may include a language selection option for specific messages and/or an option to allow one or more messages be displayed in a default language of an assigned controlled-environment resident communication and/or media device.

Turn now, additionally, to FIG. 3, a diagrammatic illustration of an example intelligent controlled-environment facility communication and/or media device interface 300, shown on example of a controlled-environment facility resident communication and/or media device 302, according to some embodiments of the present systems and methods. Controlled-environment facility resident interface 300 may run on top of, or as part of, the operating system of controlled-environment facility resident communication and/or media device 302.

An IRD (125) is illustrated in FIG. 3, as controlled-environment facility resident communication and/or media device 302, which generally shows example intelligent controlled-environment facility communication and/or media device interface 300 on IRD 302. However, similar interface and/or controlled-environment facility digital bulletin board functionality may be provided by an IFD (130), or the like.

Interface 300 shows (Digital Bulletin Board) DBB tab 304 for selection of controlled-environment facility digital bulletin board 306, which for purposes of this discussion is shown as already open. When digital bulletin board 306 is open, DBB tab 304 may not persist, or it may, as illustrated. Selection of tab DBB 304 displays digital bulletin board 306, wherein digital bulletin board messages 308 sent to device 302 are displayed, in accordance with the assigned priority and in accordance with the defined schedule for display. Messages may either scroll across the board or the messages may be constant on the screen, and/or may be displayed in default language of the controlled-environment resident communication and/or media device.

As discussed in greater detail below with respect to the flowchart of FIG. 5, in accordance with some embodiments of the present systems and methods, residents may interact with digital bulletin board messages 308, so as to pause the rotation of messages in order to fully consume a particular message, or the like. Additionally or alternatively, the digital bulletin board may also offer an ability for a resident to interact with the digital bulletin board in order to learn more details or to access additional resources. For example, various embodiments of the present systems and methods may allow a message to open more detail or open an application, when selected by the resident, as also discussed in greater detail below with respect to the flowchart of FIG. 6.

FIG. 4 is a flowchart for presenting controlled-environment facility digital bulletin board messages according to example implementation 400 of the present controlled-environment facility digital bulletin board systems and methods, under some embodiments. Implementation 400 provides a resident-facing digital bulletin board in a controlled-environment facility, in accordance with embodiments of the present systems and methods, such as digital bulletin board for use in a correctional facility for providing messages to inmates.

In accordance with implementation 400, or the like, definition of a digital bulletin board message directed to at least one controlled-environment facility resident is accepted at 402, such as from facility personnel, or the like, via a controlled-environment facility communications management system interface (300), or the like. Alternatively, or additionally, a centralized external controlled-environment facility communications management system may be used to create (i.e. define) and manage digital bulletin board messages, in accordance with some embodiments of the present systems and methods. In accordance with such embodiments, a controlled-environment facility service provider, such as a communications service provider, or the like may create messages, which may include advertising, for dissemination to controlled-environment facility residents, in accordance the present digital bulletin board systems and methods, at 402. Regardless, the message defined at 402 may include text, one or more graphics, one or more interaction mechanisms, and/or the like. Such an interaction mechanism may take the form of a link to an application program, sensitivity to interaction with any, or a particular part of the message, or the like, as discussed in greater detail below, with respect to FIGS. 5 and 6.

Assignment of a priority for displaying the digital bulletin board message defined at 402, such as relative to other digital bulletin board messages, on the digital bulletin board and a schedule for display of the digital bulletin board messages is accepted at 404, again, such as via a controlled-environment facility communications management system interface, from facility personnel, or the like.

At 406, this digital bulletin board message may be assigned to at least one intelligent controlled-environment facility resident communication and/or media device disposed in the controlled-environment facility for display. Consistent with the above discussion, these intelligent controlled-environment facility resident communication and/or media device(s) may be at least one intelligent resident controlled-environment facility resident communication and/or media device (IRD), at least one intelligent facility controlled-environment facility resident communication and/or media device (IFD), or a combination of any number of each of such devices. This assignment of the message to a device may also be made via a controlled-environment facility communications management system interface, or the like, by facility personnel of the like.

The thus-defined digital bulletin board message may be sent by the controlled-environment facility and/or communications management system at 408, in accordance with such definitions, for receipt by the intelligent controlled-environment facility resident communication and/or media device(s) to which the digital bulletin board message is assigned. In accordance with embodiments of the present systems and methods, the digital bulletin board message may be sent to the intelligent controlled-environment facility resident communication and/or media device(s) for which it is intended as an update of existing digital bulletin board messages assigned to these intelligent controlled-environment facility resident communication and/or media device(s). In which case, it is received by each of these intelligent controlled-environment facility resident communication and/or media device(s) as such an update of existing digital bulletin board messages assigned to that intelligent controlled-environment facility resident communication and/or media device.

Regardless, at 410 the digital bulletin board message is displayed by the intelligent controlled-environment facility resident communication and/or media device(s) to which is was assigned at 406, on the digital bulletin board, in accordance with the priority for displaying and the schedule assigned at 404. Messages may be displayed in default language of the controlled-environment resident communication and/or media device, and/or may either scroll across the board or the messages may be constant on the screen.

FIG. 5 is a flowchart for pausing presentation of controlled-environment facility digital bulletin board messages according to example implementation 500 of the present controlled-environment facility digital bulletin board systems and methods, under some embodiments. Thereunder, during displaying the digital bulletin board message, such as at 502/410, an intelligent controlled-environment facility resident communication and/or media device displaying the digital bulletin board message, may, at 504, receive interaction by a resident with the displayed digital bulletin board message, pausing display of other digital bulletin board messages on that intelligent controlled-environment facility resident communication and/or media device. However, display of digital bulletin board messages assigned to this intelligent controlled-environment facility resident communication and/or media device may be resumed at 506, so as to display the digital bulletin board messages assigned to this intelligent controlled-environment facility resident communication and/or media device in accordance with the assigned priority and schedule.

FIG. 6 is a flowchart for interacting with controlled-environment facility digital bulletin board messages according to example implementation 600 of the present controlled-environment facility digital bulletin board systems and methods, under some embodiments. In accordance with example implementation 600 definition of an application program relevant to at least a portion of the digital bulletin board message may be made, at 602, such as a part of defining the message at 402. This portion of the digital bulletin board message, or the like, may act as a link (e.g. hyperlink) to open the application program, providing the aforementioned interaction mechanism. Hence, during display at 410/604 of a message thus defined, the intelligent controlled-environment facility resident communication and/or media device displaying the digital bulletin board message may receive interaction by a resident with at least the portion of the displayed digital bulletin board message providing the interaction mechanism (e.g. the hyperlink) at 606. As a result, the (linked) application program relevant to the digital bulletin board message may be opened for interaction with the resident at 608 on the intelligent controlled-environment facility resident communication and/or media device which was displaying the digital bulletin board message.

Embodiments of the present systems and methods for controlled-environment facility digital bulletin board systems and methods, as described herein, may be implemented or executed, at least in part, by one or more computer systems. One such computer system is illustrated in FIG. 7. In various embodiments, computer system 700 may be a server, a mainframe computer system, a workstation, a network computer, a desktop computer, a laptop, a tablet computing device, media player, or the like. For example, in some cases, computer 700 may implement one or more steps of example processes 400, 500 and/or 600 described above with respect to FIGS. 1 through 6, and/or a computer system such as computer system 700 may be used as, or as part of, one or more of controlled-environment facility communications processing system 105, controlled-environment facility resident communication and/or media devices 120, 125, non-resident device 145, controlled-environment facility administration and management system 165, controlled-environment facility resident account management system 170, and/or the like. In various embodiments two or more of these computer systems may be configured to communicate with each other in any suitable way, such as, for example, via a network.

As illustrated, example computer system 700 includes one or more processors 710 coupled to a system memory 720 via an input/output (I/O) interface 730. Example computer system 700 further includes a network interface 740 coupled to I/O interface 730, and one or more input/output devices 750, such as video device(s) 760 (e.g., a camera), audio device(s) 770 (e.g., a microphone and/or a speaker), and display(s) 780. Computer system 700 may also include a cursor control device (e.g., a mouse or touchpad), a keyboard, etc. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In various embodiments, computer system 700 may be a single-processor system including one processor 710, or a multi-processor system including two or more processors 710 (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 6, above, may be stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-readable medium may include any tangible or non-transitory storage media or memory media such as magnetic or optical media—e.g., disk or CD/DVD-ROM coupled to computer system 700 via I/O interface 730, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any suitable protocol, timing or other data transformations to convert data signals from one component (e.g., system memory 720) into a format usable by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments, some or all of the functionality of I/O interface 730, such as an interface to system memory 720, may be incorporated into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 7, memory 720 may include program instructions 725, configured to implement certain embodiments described herein, and data storage 735, comprising various data accessible by program instructions 725. In an embodiment, program instructions 725 may include software elements corresponding to one or more of the various embodiments illustrated in the above figures. For example, program instructions 725 may be implemented in various embodiments using any desired programming language, scripting language, or combination of programming languages and/or scripting languages (e.g., C, C++, C#, JAVA®, JAVASCRIPT®, PERL®, etc.). Data storage 735 may include data that may be used in these embodiments. In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A controlled-environment facility digital bulletin board message system comprising:
    a controlled-environment facility management system and/or controlled-environment facility communications management system configured to:
        run a controlled-environment facility management interface on top of, or as part of, a controlled-environment facility and/or communications management system operating system;
        accept, via the controlled-environment facility and/or communications management interface:
            a definition of a digital bulletin board message directed to at least one controlled-environment facility resident;
            assignment of a priority for displaying the digital bulletin board message on a digital bulletin board;
            a schedule for display of the digital bulletin board message;
            assignment of the digital bulletin board message to at least one controlled-environment resident communication and/or media device disposed in a controlled-environment facility; and
    send the digital bulletin board message to the at least one controlled-environment resident communication and/or media device to which the digital bulletin board message is assigned for display in accordance with the assigned priority for display of the digital bulletin board message on the digital bulletin board and in accordance with the schedule for display of the digital bulletin board message.

2. The system of claim 1, wherein the controlled-environment facility is a correctional facility and the controlled-environment facility resident is an inmate.

3. The system of claim 1, wherein the definition of the digital bulletin board message includes text to be included in the digital bulletin board message.

4. The system of claim 1, wherein the definition of the digital bulletin board message includes at least one graphic to be included in the digital bulletin board message.

5. The system of claim 1, wherein the definition of the digital bulletin board message includes an interaction mechanism to be included in the digital bulletin board message.

6. The system of claim 5, wherein the interaction mechanism comprises a link to an application program relevant to at least a portion of the digital bulletin board message, and wherein display of the digital bulletin board message further comprises:
    receiving, by a controlled-environment resident communication and/or media device that is displaying the digital bulletin board message, interaction by a resident with the interaction mechanism in the displayed digital bulletin board message; and
    opening the application program, in response to the interaction with the interaction mechanism, for further interaction with the resident.

7. The system of claim 5, wherein the controlled-environment facility and/or communications management system is further configured to define the interaction mechanism to receive, via a controlled-environment resident communication and/or media device that is displaying the digital bulletin board message, interaction by a resident with the interaction mechanism in the displayed digital bulletin board message, and wherein the at least one controlled-environment resident communication and/or media device is further configured to:
    pause display of other digital bulletin board messages on the controlled-environment resident communication and/or media device displaying the digital bulletin board message in response to the interaction; and
    resume display of digital bulletin board messages assigned to the controlled-environment resident communication and/or media device displaying the digital bulletin board message, in accordance with the assigned priority and schedule for display of the digital bulletin board messages assigned to the controlled-environment resident communication and/or media device displaying the digital bulletin board message, after a predetermined time.

8. The system of claim 1, wherein the digital bulletin board message is sent to the at least one controlled-environment resident communication and/or media device by the controlled-environment facility and/or communications management system facility, and is received by the at least one controlled-environment resident communication and/or media device, as an update of existing digital bulletin board messages assigned to the at least one controlled-environment resident communication and/or media device.

9. The system of claim 1, wherein the system further comprises the at least one controlled-environment resident communication and/or media device, and the at least one controlled-environment resident communication and/or media device is at least one personal computer wireless device adapted and/or approved for use in controlled-environment facility.

10. The system of claim 1, wherein the system further comprises the at least one controlled-environment resident communication and/or media device, and the at least one controlled-environment resident communication and/or media device is at least one video phone particularly adapted for use in a controlled-environment facility.

11. A method for providing a resident-facing digital bulletin board in a controlled-environment facility, comprising:
    accepting, via a controlled-environment facility management system and/or controlled-environment facility communications management system interface, a definition of a digital bulletin board message directed to at least one controlled-environment facility resident;
    accepting, via the controlled-environment facility management system and/or controlled-environment facility communications management system interface, assignment of a priority for displaying the digital bulletin board message on a digital bulletin board and a schedule for display of the digital bulletin board message;
    accepting, via the controlled-environment facility management system and/or controlled-environment facility communications management system interface, assignment of the digital bulletin board message to at least one controlled-environment resident communication and/or media device disposed in a controlled-environment facility;

receiving the digital bulletin board message by the at least one controlled-environment resident communication and/or media device to which the digital bulletin board message is assigned; and displaying the digital bulletin board message, by the at least one controlled-environment resident communication and/or media device to which the digital bulletin board message is assigned, in accordance with the assigned priority for displaying the digital bulletin board message on the digital bulletin board and the schedule for display of the digital bulletin board message.

12. The method of claim 11 wherein the controlled-environment facility is a correctional facility and the controlled-environment facility resident is an inmate.

13. The method of claim 11, wherein the definition of the digital bulletin board message includes text to be included in the digital bulletin board message.

14. The method of claim 11, wherein the definition of the digital bulletin board message includes an at least one graphic to be included in the digital bulletin board message.

15. The method of claim 11, wherein the definition of the digital bulletin board message includes interaction mechanism to be included in the digital bulletin board message.

16. The method of claim 15, further comprising accepting definition of an application program relevant to at least a portion of the digital bulletin board message as the interaction mechanism, and wherein displaying the digital bulletin board message further comprises:

receiving, by a controlled-environment resident communication and/or media device displaying the digital bulletin board message, interaction by a resident with at least the portion of the displayed digital bulletin board message; and opening the application program relevant to the digital bulletin board message for further interaction with the resident.

17. The method of claim 11, wherein displaying the digital bulletin board message further comprises:

receiving, by a controlled-environment resident communication and/or media device displaying the digital bulletin board message, interaction by a resident with the displayed digital bulletin board message;

pausing display of other digital bulletin board messages on the controlled-environment resident communication and/or media device displaying the digital bulletin board message; and resuming display of digital bulletin board messages assigned to the controlled-environment resident communication and/or media device, in accordance with the assigned priority and schedule for display of the digital bulletin board messages assigned to the controlled-environment resident communication and/or media device after a predetermined time.

18. The method of claim 11, wherein the digital bulletin board message is sent to the at least one controlled-environment resident communication and/or media device by the controlled-environment facility communications management system as an update of existing digital bulletin board messages assigned to the at least one controlled-environment resident communication and/or media device, and is received by the at least one controlled-environment resident communication and/or media device, as an update of existing digital bulletin board messages assigned to the at least one controlled-environment resident communication and/or media device.

19. The method of claim 11, wherein the at least one controlled-environment resident communication and/or media device is at least one personal computer wireless device adapted and/or approved for use in controlled-environment facility.

20. The method of claim 11, wherein the at least one controlled-environment resident communication and/or media device is at least one video phone particularly adapted for use in a controlled-environment facility.

21. A tangible non-transitory computer-readable storage medium having program instructions stored thereon that, upon execution by one or more controlled-environment facility associated computer systems cause the one or more controlled-environment facility associated computer systems to:

run a controlled-environment facility management system and/or controlled-environment facility communications management interface on top of, or as part of, a controlled-environment facility management system and/or controlled-environment facility communications and/or management system operating system;

accept, via the controlled-environment facility management system and/or controlled-environment facility communications management system interface, a definition of a digital bulletin board message directed to at least one controlled-environment facility resident;

accept, via the controlled-environment facility management system and/or controlled-environment facility communications management system interface, assignment of a priority for displaying the digital bulletin board message on a digital bulletin board and a schedule for display of the digital bulletin board message;

accept, via the controlled-environment facility management system and/or controlled-environment facility communications management system interface, assignment of the digital bulletin board message to at least one controlled-environment resident communication and/or media device disposed in a controlled-environment facility;

receive the digital bulletin board message by the at least one controlled-environment resident communication and/or media device to which the digital bulletin board message is assigned; and display the digital bulletin board message, by the at least one controlled-environment resident communication and/or media device to which the digital bulletin board message is assigned, in accordance with the assigned priority for displaying the digital bulletin board message on the digital bulletin board and the schedule for display of the digital bulletin board message.

\* \* \* \* \*